D. B. MORISON.
COOLING TOWER.
APPLICATION FILED JUNE 18, 1909.

965,116.

Patented July 19, 1910.
5 SHEETS—SHEET 1.

ATTEST

INVENTOR.
DONALD BARNS MORISON
ATTYS

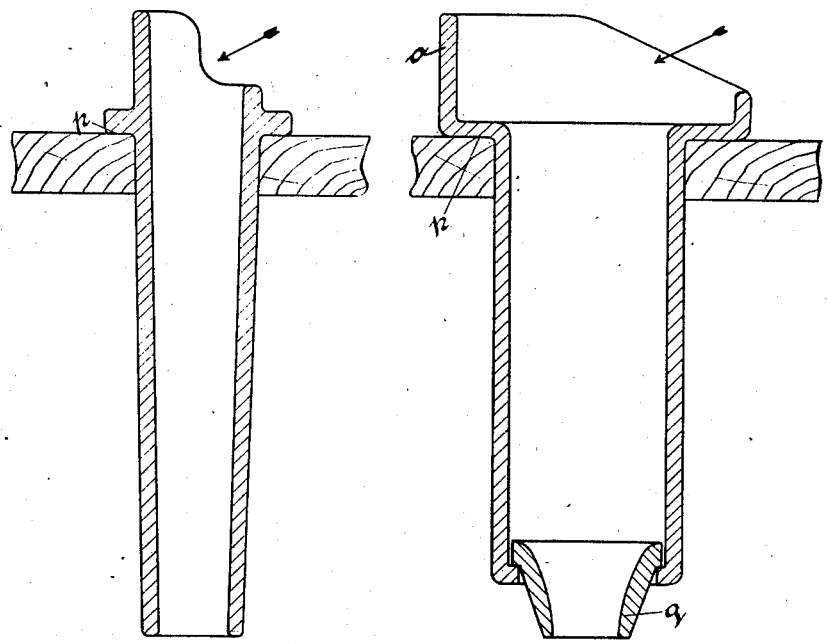
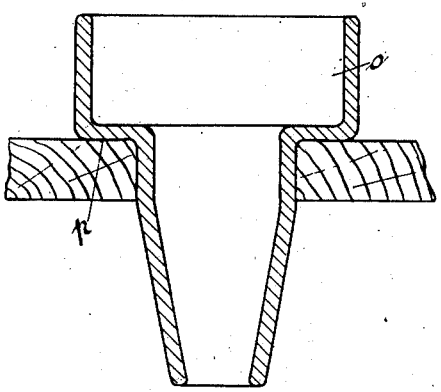

D. B. MORISON.
COOLING TOWER.
APPLICATION FILED JUNE 18, 1909.

965,116.

Patented July 19, 1910.
5 SHEETS—SHEET 3.

ATTEST.

INVENTOR.
DONALD BARNS MORISON.

D. B. MORISON.
COOLING TOWER.
APPLICATION FILED JUNE 18, 1909.

965,116.

Patented July 19, 1910.
5 SHEETS—SHEET 4.

ATTEST.
INVENTOR.
DONALD BARNS MORISON.
ATT'YS

D. B. MORISON.
COOLING TOWER.
APPLICATION FILED JUNE 18, 1909.

965,116.

Patented July 19, 1910.
5 SHEETS—SHEET 5.

ATTEST.
*Benth. Stahl.*
*Ewd L. Tolson.*

INVENTOR.
DONALD BARNS MORISON.
*Spear, Middleton, Donaldson & Spear*
ATTY'S.

UNITED STATES PATENT OFFICE.

DONALD BARNS MORISON, OF HARTLEPOOL, ENGLAND.

COOLING-TOWER.

965,116. Specification of Letters Patent. Patented July 19, 1910.

Application filed June 18, 1909. Serial No. 502,971.

*To all whom it may concern:*

Be it known that I, DONALD BARNS MORISON, a subject of the King of Great Britain and Ireland, residing at Hartlepool Engine Works, Hartlepool, in the county of Durham, England, have invented certain new and useful Improvements Relating to Cooling-Towers, of which the following is a specification.

My invention relates to means for distributing and collecting the water in water cooling towers, my object being to repeatedly distribute the water with great uniformity over the whole horizontal sectional area of the tower and in a manner conducive to great cooling effect without the use of apparatus likely to get out of order through impurities in the water, corrosion or otherwise.

My invention consists in combinations of apparatus, which will be described in the following specification and more particularly set forth in the annexed claims.

Figure 1:
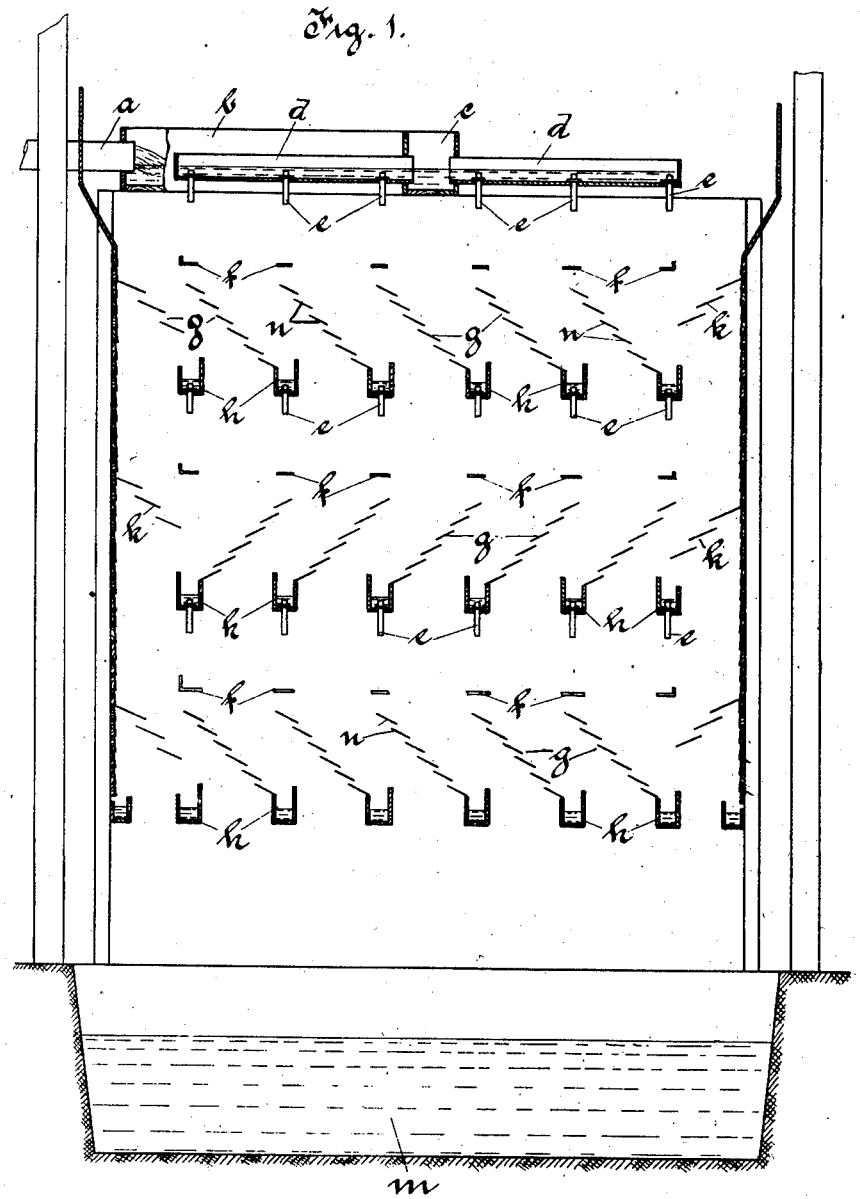
Figure 5:
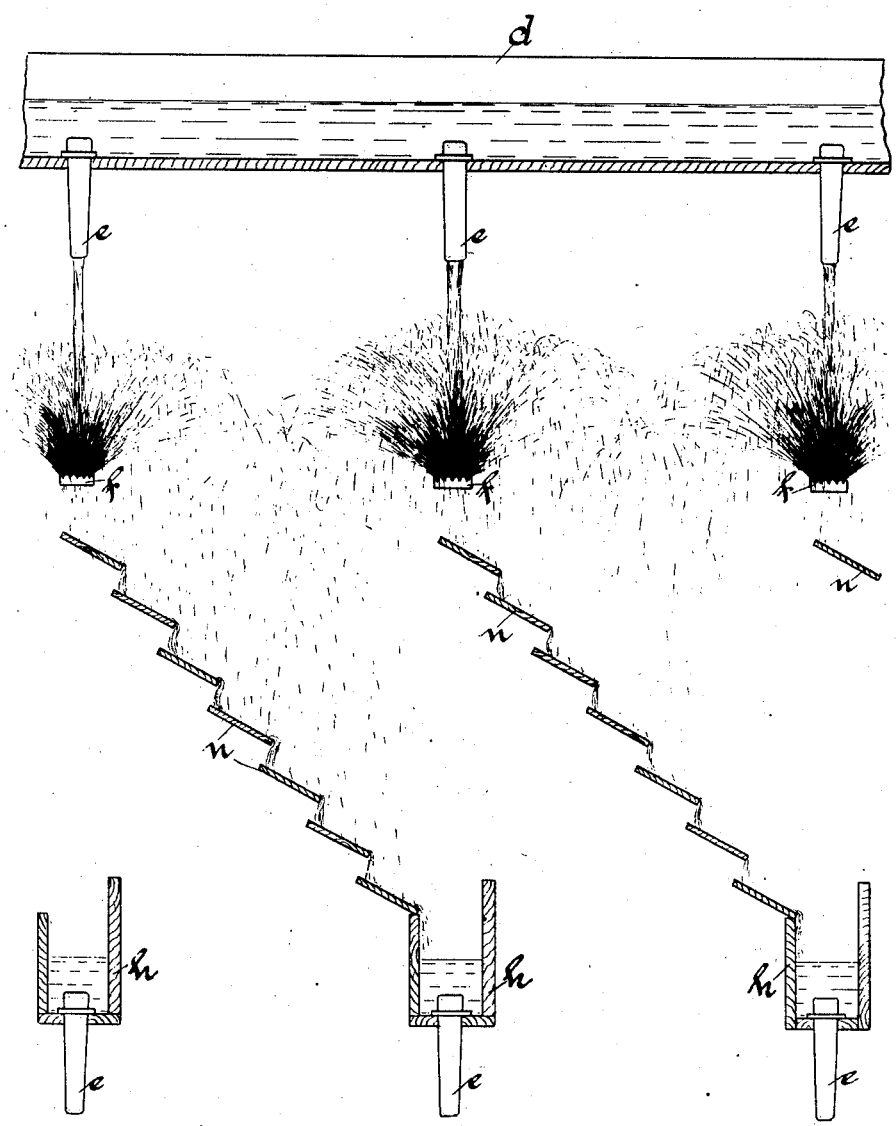

Referring to the accompanying drawings, Figure 1 is a vertical section through a cooling tower provided with apparatus according to my invention. Figs. 2, 3 and 4 show in vertical section alternative forms of water discharge nozzle. Fig. 5 is a vertical section through three nozzles, sprayers and troughs. Figs. 6 and 7, 8 and 9, 10 and 11, and 12 and 13 are respectively vertical sections and plans of distributing plates or sprayers adapted to receive the water discharged from the nozzles. Figs. 14–18 illustrate the action of the sprayer shown in Figs. 6 and 7.

Referring to Fig. 1—*a* is the water supply pipe, which delivers the water to be cooled into the tower. The water is conveyed from this supply pipe *a*, by way of the supply trough *b*, to the main longitudinal trough *c*, which extends practically the whole length of the tower. Communicating with this longitudinal trough *c* are a series of distributing troughs *d*, *d*, of which two only are shown, the others being parallel to these. These distributing troughs, which will hereinafter be referred to as the primary distributing troughs, extend from the longitudinal trough *c*, nearly to the sides of the tower and are provided with nozzles *e*, *e*, which pass through the bottom of the trough and are pitched approximately evenly across the breadth of the tower. Distributing plates or sprayers *f*, *f*, are arranged one under each nozzle, these sprayers being adapted to receive and distribute the water discharged by the nozzles, as illustrated in Fig. 5. Inclined planes *g*, *g*, are arranged below the sprayers to receive the water thrown upward and outward by the latter and deliver it into a second series of troughs *h*, *h*, hereinafter referred to as the secondary distributing troughs. Several sets of secondary troughs are provided in the tower, each being furnished, like the primary troughs, with discharge nozzles and sprayers, and collecting planes being arranged between each set of troughs, the arrangement being clearly shown in Figs. 1 and 5.

The planes *g*, *g*, extend upward in a diagonal direction, each springing from, or from just above, a secondary trough which is parallel to it. The planes are advantageously constructed, as shown in Fig. 5, of a series of boards *n*, *n*, each horizontal as regards its length but sloping laterally and arranged in echelon, one above the other, so that each delivers the water on to the board next below it, except for the lowest board which discharges into the trough, and spaces being provided between the individual boards for the passage of air. Auxiliary planes *k* (Fig. 1) may be provided to guide inwardly the water thrown on or toward the sides of the tower.

The water may be allowed to overflow from the ends of the last set of secondary troughs to the tank *m*, at the bottom of the tower.

The nozzles, hereinbefore referred to, may be variously constructed; but, in order that the sprayers may act effectively, it is desirable that each sprayer should receive a "solid" jet or "rope" of water and, with this object in view, the nozzles are preferably constructed with an outlet end of smaller sectional area than the inlet end; convenient designs of nozzle are shown in Fig. 2, 3 and 4. Moreover, in order to assist the entry of the water into the nozzle, the latter may be provided with an enlarged portion *o*, at its upper end, as shown in Figs. 3 and 4, and may be cut away on the side at which the water enters, as shown in Figs. 2 and 3. The nozzles are conveniently supported on the bottoms of the troughs by means of shoulders or flanges *p*. In the nozzle shown in Fig. 3, the main portion is intended to be constructed of cast iron, provided with an exit converging member *q* formed of porcelain.

Figure 6:
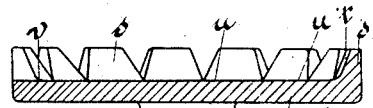
Figure 7:
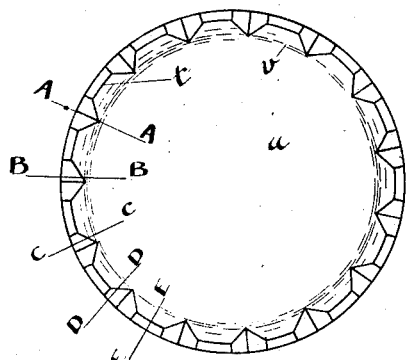

A very efficient form of distributing plate or sprayer is shown in Figs. 6 and 7. The plate is shaped like a crown wheel with a flat central portion *r* and a peripheral serrated ridge *s*. The interior face *t* of this ridge is inclined at a small angle to the vertical—or may in some cases be quite vertical—and is connected with the flat surface *u* of the body part of the plate by a small curve or chamfer *v*. The jet of water is directed from the nozzle against the center of the upper flat surface *u* and spreads out in a film which is deflected upward by the chamfer and distributed by the serrated ridge. To illustrate this distributing action, partial sections of the plate are shown in Figs. 14, 15, 16 17 and 18, these sections being respectively on the lines AA, BB, CC, DD and EE, of Fig. 7; and it will be seen by reference to these figures that the water is thrown outward to a varying extent according to the portion of the ridge which it strikes. By this means, not only is the water finely divided and spread to a considerable distance around the sprayers; but, owing to its varying treatment by the different portions of the peripheral ridge, it practically covers, in falling, the whole area within the circle or boundary passing through the outermost drops. Moreover, the water is projected upward to a considerable height above the sprayers and, being in a fine state of division, is in the air for a considerable period, the cooling effect due to this period of suspension being, in the case of water cooling towers, very appreciable.

Figure 8:
Figure 9:
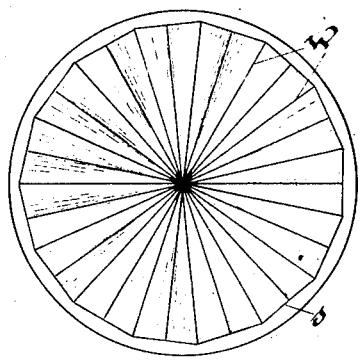

Figs. 8 and 9 are respectively a vertical section and plan of a modified form of sprayer wherein the flat body part *r* and the upwardly extending peripheral ridge *s* are retained; but the peripheral ridge in this case is of uniform height, and radial ridges *w* are formed on the upper surface of the body, extending and increasing in depth from the center of the plate to the periphery.

Figure 10:
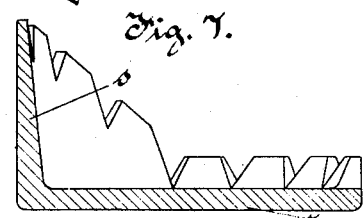
Figure 12:
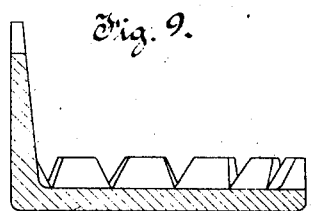
Figure 11:
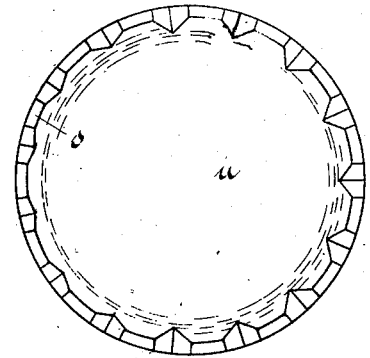
Figure 13:
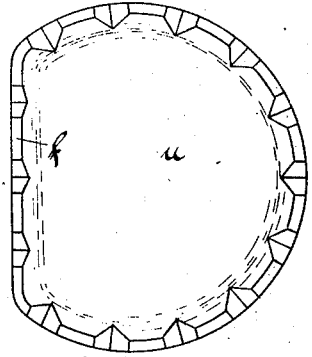
Figure 14:
Figure 15:
Figure 16:
Figure 17:
Figure 18:

It is desirable to keep the spray as far as possible from striking the sides of the tower if the latter is of the closed-in type, or of passing out at the sides if the tower is of the open type; and, with this object in view, I may construct the outermost sprayers with the peripheral ridge elevated at one side as shown in Figs. 10 and 11 which illustrate one convenient design, or Figs. 12 and 13 which illustrate another design.

Having now described my invention, what I claim as new and desire to secure by Letters Patent is:—

1. In water-cooling towers, in combination, a set of primary distributing troughs horizontally arranged, means for supplying water to said troughs, a set of discharge nozzles for said troughs, a set of sprayers in line with said nozzle and upon which the discharged water impinges to be distributed, a set of planes receiving the water distributed by said sprayers, and a set of secondary troughs receiving the water from said planes, substantially as described.

2. In water-cooling towers, in combination, a set of primary distributing troughs, arranged in parallel as regards water distribution, means for supplying said troughs with water, a set of discharge nozzles arranged vertically through the bottoms of said troughs, a set of sprayers in line with the discharge nozzles and upon which the water impinges and is distributed, a set of planes receiving and collecting the water distributed by said sprayers and a set of secondary troughs receiving the water collected by said planes, substantially as described.

3. In water-cooling towers, in combination, a set of primary distributing troughs arranged in parallel as regards water distribution, means for supplying said troughs with water, a set of discharge nozzles for said troughs, a set of sprayers, each in line with one of the discharge nozzles and upon which the water impinges, a set of planes receiving and collecting the water distributed by said sprayers, and a set of secondary troughs receiving the water collected by said planes, substantially as described.

4. In water-cooling towers, in combination, a set of primary distributing troughs horizontally arranged, means for supplying water to said troughs, a set of discharge nozzles for the said troughs, a set of sprayers arranged in line with said nozzles to receive and distribute the water discharged by said nozzles, a set of planes receiving and collecting the water distributed by said sprayers, and a set of secondary troughs receiving the water collected by said planes, the said planes being arranged in stepped relation to each other with air passages between the several planes, substantially as described.

5. In water-cooling towers, in combination, a set of primary distributing troughs arranged in parallel as regards water distribution, means for supplying said troughs with water, a set of discharge nozzles for said troughs, a set of sprayers, each in line with one of the nozzles to receive and distribute the water discharged from the same, a set of planes receiving and collecting the water distributed by said sprayers, and a set of secondary troughs receiving the water collected by said planes, the said planes being arranged in stepped relation to each other with air passages between the several planes, substantially as described.

6. In water-cooling towers, in combination, a plurality of sets of troughs, the members of each set being arranged horizontally and the sets being arranged vertically, discharge nozzles for said troughs, sprayers in line with said nozzles to receive and distribute the water discharged by said nozzles, and planes receiving the water distributed by said sprayers and delivering this water into said troughs, substantially as described.

7. In water-cooling towers, in combination, a plurality of sets of troughs, the members of each set being arranged horizontally and the sets being arranged vertically, discharge nozzles for said troughs, sprayers in line with said nozzles to receive and distribute the water discharged by said nozzles, and planes receiving the water distributed by said sprayers and delivering this water into said troughs, the said planes being arranged in stepped relation to each other with air passages between the several planes, substantially as described.

8. In water-cooling towers, in combination, a plurality of sets of troughs, the members of each set being arranged horizontally and the sets being arranged vertically, discharge nozzles for said troughs, sprayers in line with the nozzles receiving and distributing the water from said nozzles, one sprayer for each nozzle, and planes receiving the water distributed by said sprayers and delivering this water into said troughs, substantially as described.

9. In water-cooling towers, in combination, a plurality of sets of troughs, the members of each set being arranged horizontally and the sets being arranged vertically, discharge nozzles for said troughs, sprayers arranged in line with the nozzles receiving and distributing the water from said nozzles, one sprayer for each nozzle, and planes receiving the water distributed by said sprayers and delivering this water into said troughs, the said planes arranged in stepped relation to each other with air passages between the several planes, substantially as described.

In testimony whereof, I affix my signature in presence of two witnesses.

DONALD BARNS MORISON.

Witnesses:
GEORGE WILLIAM VICTOR BURNS,
THOMAS STANLEY BLENKINSOP.